United States Patent
Li et al.

(10) Patent No.: US 10,823,896 B2
(45) Date of Patent: Nov. 3, 2020

(54) FILM HAVING PARALLEL PROTRUSIONS APPLIED TO DISPLAY, DISPLAY, AND TERMINAL

(71) Applicant: Huawei Technologies Co., Ltd., Shenzhen (CN)

(72) Inventors: Meng Li, Shenzhen (CN); Huie Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 148 days.

(21) Appl. No.: 16/073,170

(22) PCT Filed: Jul. 8, 2016

(86) PCT No.: PCT/CN2016/089432
§ 371 (c)(1),
(2) Date: Jul. 26, 2018

(87) PCT Pub. No.: WO2018/006418
PCT Pub. Date: Jan. 11, 2018

(65) Prior Publication Data
US 2019/0041568 A1    Feb. 7, 2019

(51) Int. Cl.
*F21V 8/00*        (2006.01)
*G09F 9/30*        (2006.01)

(52) U.S. Cl.
CPC ......... *G02B 6/0036* (2013.01); *G02B 6/0053* (2013.01); *G02B 6/0055* (2013.01); *G09F 9/30* (2013.01); *G02B 6/0065* (2013.01)

(58) Field of Classification Search
CPC .. G02B 6/0036; G02B 6/0053; G02B 6/0055; G02B 6/0065; G09F 9/30

USPC ......................................................... 359/227
See application file for complete search history.

(56) References Cited

U.S. PATENT DOCUMENTS

| | | | |
|---|---|---|---|
| 2004/0190102 A1 | 9/2004 | Mullen et al. | |
| 2007/0195418 A1* | 8/2007 | Kogure | G02B 6/0053 359/599 |
| 2011/0044058 A1* | 2/2011 | Shim | G02B 6/0038 362/311.06 |
| 2011/0255304 A1 | 10/2011 | Kinoshita | |
| 2011/0299012 A1 | 12/2011 | Wang et al. | |

(Continued)

FOREIGN PATENT DOCUMENTS

| CN | 1894605 A | 1/2007 |
|---|---|---|
| CN | 202011300 U | 10/2011 |

(Continued)

OTHER PUBLICATIONS

Machine Translation and Abstract of Chinese Publication No. CN104849797, Aug. 19, 2015, 18 pages.

(Continued)

*Primary Examiner* — Collin X Beatty (57) ABSTRACT

A film applied to a display, a display, and a terminal, where the film includes a film body and a plurality of rectilinear protrusions, the rectilinear protrusions are distributed on a surface of the film body, and neighboring rectilinear protrusions are parallel to each other. When the film is adhered to a rear surface of a cover glass, a sense of layering and transparency of the cover glass can be enhanced, thereby effectively improving a display effect of the display.

11 Claims, 6 Drawing Sheets

(56) References Cited

U.S. PATENT DOCUMENTS

| | | | | |
|---|---|---|---|---|
| 2012/0057100 A1* | 3/2012 | Masuda | ............. | B29C 33/3878 |
| | | | | 349/62 |
| 2014/0078775 A1 | 3/2014 | Lee et al. | | |
| 2014/0355250 A1* | 12/2014 | Tyan | ................... | G02B 5/0226 |
| | | | | 362/97.1 |
| 2015/0131317 A1* | 5/2015 | Yuki | ...................... | G02B 6/002 |
| | | | | 362/610 |
| 2016/0313496 A1 | 10/2016 | Hirayama et al. | | |
| 2017/0336542 A1* | 11/2017 | Tai | ............................ | F21V 5/02 |

FOREIGN PATENT DOCUMENTS

| | | | | |
|---|---|---|---|---|
| CN | 104849797 | A | 8/2015 | |
| CN | 105679774 | A | 6/2016 | |
| CN | 205291738 | U | 6/2016 | |
| EP | 0942227 | A1 | 9/1999 | |
| EP | 0942227 | B1 * | 3/2004 | ............... F21V 5/02 |
| EP | 1780464 | A1 | 5/2007 | |
| WO | 2015093396 | A1 | 6/2015 | |

OTHER PUBLICATIONS

Machine Translation and Abstract of Chinese Publication No. CN105679774, Jun. 15, 2016, 30 pages.

Machine Translation and Abstract of Chinese Publication No. CN202011300, Oct. 19, 2011, 4 pages.

Machine Translation and Abstract of Chinese Publication No. CN205291738, Jun. 8, 2016, 15 pages.

Foreign Communication From a Counterpart Application, PCT Application No. PCT/CN2016/089432, English Translation of International Search Report dated Mar. 31, 2017, 2 pages.

Foreign Communication From a Counterpart Application, European Application No. 16907922.5, Extended European Search Report dated Jun. 7, 2019, 8 pages.

Foreign Communication From a Counterpart Application, Chinese Application No. 201680001568.2, Chinese Office Action dated Jun. 4, 2019, 7 pages.

* cited by examiner

FILM HAVING PARALLEL PROTRUSIONS APPLIED TO DISPLAY, DISPLAY, AND TERMINAL

CROSS-REFERENCE TO RELATED APPLICATIONS

This application is a U.S. National State of International Patent Application No. PCT/CN2016/089432 filed on Jul. 8, 2016, which is hereby incorporated by reference in its entirety.

TECHNICAL FIELD

Embodiments of the present invention relate to the field of mobile terminal display technologies, and in particular, to a film applied to a display, a display, and a terminal.

BACKGROUND

A display of a mobile terminal plays an increasingly important role on user experience of the mobile terminal. The display may specifically include a display panel and a cover glass (Cover Glass, CG for short) covering the display panel. A main function of the cover glass is to improve an overall visual effect of the display and a mobile terminal body. With continuous development of technologies, appearance quality of the mobile terminal can be improved by improving the cover glass from planar glass to 2.5D (2.5 Dimension) glass and 3D (3 Dimension) glass. Then, to further improve the appearance quality of the mobile terminal, a film layer may further be disposed on a rear surface of the cover glass by using a glass screen printing process or an optical coating process, to improve a visual effect of the cover glass.

However, the improvements to the cover glass make display effects of mobile terminals using such an improved cover glass tend to be more similar, and cannot further improve the overall visual effect of the display and the mobile terminal body effectively.

SUMMARY

Embodiments of the present invention provide a film applied to a display, a display, and a terminal, to enhance a sense of layering and transparency of a cover glass, and effectively improve a display effect of the display.

According to a first aspect, an embodiment of the present invention provides a film applied to a display, where the film includes a film body and a plurality of rectilinear protrusions, the plurality of rectilinear protrusions are distributed in sequence on a surface of the film body, and neighboring rectilinear protrusions are parallel to each other.

In this implementation, the plurality of rectilinear protrusions are disposed on the surface of the film body of the film, and the neighboring rectilinear protrusions are parallel to each other, so that the film reflects a striped texture. When the film in this implementation is adhered to a rear surface of the cover glass, intrinsic reflectivity and a refractive index of the cover glass can be effectively changed, the cover glass can generate an extremely rich and fine dazzling effect, and a sense of layering and transparency of the cover glass are enhanced, thereby effectively improving a display effect of a product.

With reference to the first aspect, in a possible implementation of the first aspect, the plurality of rectilinear protrusions are distributed in sequence on the surface of the film body along a length direction of the film body.

In this implementation, based on the first aspect, specifically, the plurality of rectilinear protrusions are disposed in sequence on the surface of the film body along the length direction of the film body, so that the film specifically reflects a cross-striped texture. When the film in this implementation is adhered to the rear surface of the cover glass, the intrinsic reflectivity and the refractive index of the cover glass can be effectively changed, the cover glass can generate an extremely rich and fine dazzling effect, and the sense of layering and transparency of the cover glass are enhanced, thereby effectively improving a display effect of a product.

With reference to any one of the first aspect or the foregoing possible implementations of the first aspect, in a possible implementation of the first aspect, a value range of a height of each rectilinear protrusion is 2 microns to 30 microns.

In this implementation, specifically, the value range of the height of each rectilinear protrusion is set to 2 microns to 30 microns, so that when the film in this implementation is adhered to the rear surface of the cover glass, the intrinsic reflectivity and the refractive index of the cover glass can be further effectively changed, the cover glass can generate an extremely rich and fine dazzling effect, and the sense of layering and transparency of the cover glass are further enhanced, thereby further effectively improving a display effect of a product.

With reference to any one of the first aspect or the foregoing possible implementations of the first aspect, in a possible implementation of the first aspect, a value range of a width of each rectilinear protrusion is 20 microns to 200 microns, and a length of each rectilinear protrusion is the same as a width of the film body.

In this implementation, specifically, the value range of the width of each rectilinear protrusion is set to 20 microns to 200 microns, and the length of each rectilinear protrusion is set to be the same as the width of the film body, so that when the film in this implementation is adhered to the rear surface of the cover glass, the intrinsic reflectivity and the refractive index of the cover glass can be further effectively changed, the cover glass can generate an extremely rich and fine dazzling effect, and the sense of layering and transparency of the cover glass is further enhanced, thereby further effectively improving a display effect of a product.

With reference to any one of the first aspect or the foregoing possible implementations of the first aspect, in a possible implementation of the first aspect, a cross-section of each rectilinear protrusion along the length direction of the film body is arc-shaped.

With reference to any one of the first aspect or the foregoing possible implementations of the first aspect, in a possible implementation of the first aspect, a cross-section of each rectilinear protrusion along the length direction of the film body is triangular.

With reference to any one of the first aspect or the foregoing possible implementations of the first aspect, in a possible implementation of the first aspect, a cross-section of each rectilinear protrusion along the length direction of the film body is trapezoidal.

With reference to any one of the first aspect or the foregoing possible implementations of the first aspect, in a possible implementation of the first aspect, neighboring distributed rectilinear protrusions in the plurality of rectilinear protrusions are spaced at a first preset distance, and a value range of the first preset distance is 0 microns to 300 microns.

In this implementation, specifically, the neighboring distributed rectilinear protrusions in the plurality of rectilinear protrusions are spaced at the first preset distance, and the value range of the first preset distance is 0 microns to 300 microns, so that when the film in this implementation is adhered to the rear surface of the cover glass, the intrinsic reflectivity and the refractive index of the cover glass can be further effectively changed, the cover glass can generate an extremely rich and fine dazzling effect, and the sense of layering and transparency of the cover glass are further enhanced, thereby further effectively improving a display effect of a product.

According to a second aspect, an embodiment of the present invention provides a film applied to a display, where the film includes a film body and a plurality of corrugated protrusions, the plurality of corrugated protrusions are distributed in sequence on a surface of the film body, and neighboring corrugated protrusions are parallel to each other.

In this implementation, the plurality of corrugated protrusions are disposed on the surface of the film body of the film, and the neighboring corrugated protrusions are parallel to each other, so that the film reflects a corrugated texture. When the film in this implementation is adhered to a rear surface of a glass panel, intrinsic reflectivity and a refractive index of the cover glass can be effectively changed, the cover glass can generate an extremely rich and fine dazzling effect, and a sense of layering and transparency of the cover glass are enhanced, thereby effectively improving a display effect of a product.

With reference to the second aspect, in a possible implementation of the second aspect, the plurality of corrugated protrusions are distributed in sequence on the surface of the film body along a length direction of the film body.

In this implementation, specifically, the plurality of corrugated protrusions are distributed in sequence on the surface of the film body along the length direction of the film body, so that when the film in this implementation is adhered to the rear surface of the cover glass, the intrinsic reflectivity and the refractive index of the cover glass can be further effectively changed, the cover glass can generate an extremely rich and fine dazzling effect, the sense of layering and transparency of the cover glass are further enhanced, thereby further effectively improving a display effect of a product.

With reference to any one of the second aspect or the foregoing possible implementations of the second aspect, in a possible implementation of the second aspect, a value range of a height of each corrugated protrusion is 2 microns to 20 microns.

With reference to any one of the second aspect or the foregoing possible implementations of the second aspect, in a possible implementation of the second aspect, a value range of a width of each corrugated protrusion is 20 microns to 200 microns, and a length of each corrugated protrusion along a width direction of the film body is the same as a width of the film body.

With reference to any one of the second aspect or the foregoing possible implementations of the second aspect, in a possible implementation of the second aspect, neighboring distributed corrugated protrusions in the plurality of corrugated protrusions are spaced at a second preset distance, and a value range of the second preset distance is 20 microns to 250 microns.

With reference to any one of the second aspect or the foregoing possible implementations of the second aspect, in a possible implementation of the second aspect, a cross-section of each corrugated protrusion along the length direction of the film body is arc-shaped.

According to a third aspect, an embodiment of the present invention provides a display. The display includes a cover glass and the film according to any one of the first aspect or the foregoing possible implementations of the first aspect, and the film is adhered to the cover glass.

In this implementation, when the film according to any one of the first aspect or the foregoing possible implementations of the first aspect is applied to the display, intrinsic reflectivity and a refractive index of the cover glass of the display can be effectively changed, the cover glass of the display can generate an extremely rich and fine dazzling effect, and a sense of layering and transparency of the cover glass of the display are enhanced, thereby effectively improving a display effect of the display.

According to a fourth aspect, an embodiment of the present invention provides a display. The display includes a cover glass and the film according to any one of the second aspect or the foregoing possible implementations of the second aspect, and the film is adhered to the cover glass.

In this implementation, when the film according to any one of the second aspect or the foregoing possible implementations of the second aspect is applied to the display, intrinsic reflectivity and a refractive index of the cover glass of the display can be effectively changed, the cover glass of the display can generate an extremely rich and fine dazzling effect, and a sense of layering and transparency of the cover glass of the display are enhanced, thereby effectively improving a display effect of the display.

According to a fifth aspect, an embodiment of the present invention provides a terminal, including the display according to the third aspect.

In this implementation, because a striped texture film is disposed in the display according to the third aspect, a display effect of the display can be effectively improved, thereby improving product quality of a terminal provided with the display.

According to a sixth aspect, an embodiment of the present invention provides a terminal, including the display according to the fourth aspect.

In this implementation, because a corrugated texture film is disposed in the display according to the fourth aspect, a display effect of the display can be effectively improved, thereby improving product quality of a terminal provided with the display.

The embodiments of the present invention are applied to the film in a display, the display, and the terminal. The plurality of rectilinear protrusions are disposed on the surface of the film body of the film, and the neighboring rectilinear protrusions are parallel to each other, so that the film reflects a striped texture. When the film in the embodiments is adhered to the rear surface of the cover glass, the intrinsic reflectivity and the refractive index of the cover glass can be effectively changed, the cover glass can generate an extremely rich and fine dazzling effect, and the sense of layering and transparency of the cover glass are enhanced, thereby effectively improving a display effect of a product.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A film in embodiments of the present invention may be specifically applied to various terminals including a display, and the terminal may be a mobile phone, a tablet computer (PAD), a personal computer (Personal Computer, PC for short), a television, and the like. Specifically, the display may include a cover glass and a display panel. The display panel may be specifically a liquid crystal display (Liquid Crystal Display, LCD for short), or may be an LED display. Certainly, for mobile terminals, the display may further include a touch panel. The touch panel may be separately disposed in the display, or may be integrated with the cover glass, or may be integrated with the display panel. The embodiments of the present invention provide a film (Film). The film (Film) in the embodiments of the present invention is disposed on a rear surface of a cover glass of a terminal by using an optical coating process (in which the film in the embodiments of the present invention is coated on the rear surface of the cover glass by using a physical or chemical method to change reflection and transmission characteristics of the cover glass), so that intrinsic reflectivity and a refractive index of the cover glass are changed by using the film in the embodiments of the present invention, the cover glass can generate an extremely rich and fine dazzling effect when the cover glass is viewed from any angle, and a sense of layering and transparency of the cover glass are enhanced, thereby effectively improving appearance quality of the terminal using the cover glass. The rear surface of the cover glass specifically refers to a surface of the cover glass near the display panel, and the cover glass is adhered to the display panel. In the foregoing process, alternatively, a glass screen printing process (where screen printing is performed on the rear surface of the cover glass) may be jointly used, to further improve quality of the cover glass. The optical coating process may be specifically a Non-conductive vacuum metallization (Non conductive vacuum metallization, NCVM for short) process.

The film in the embodiments of the present invention may be specifically a high temperature-resistant polyester film (PET).

Figure 1:
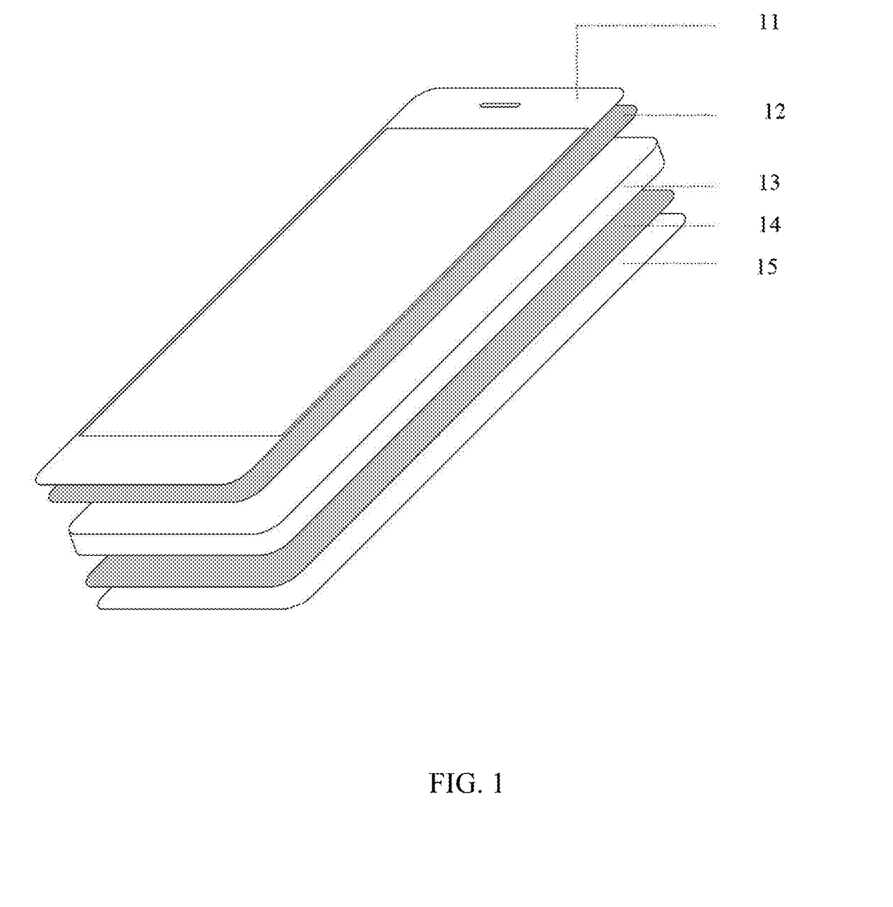
FIG. 1 is a schematic diagram of an application scenario of a film applied to a display according to the present invention.

FIG. 1 is a schematic diagram of an application scenario of a film applied to a display according to the present invention. Specifically, the film in an embodiment of the present invention may be applied to a mobile phone, and FIG. 1 may be a simplified schematic exploded view of the mobile phone. As shown in FIG. 1, the mobile phone may specifically include a cover glass (CG) 11, a film 12, a middle frame main housing 13, a film 14, and a cover glass (CG) 15. Specifically, the cover glass 11 and the cover glass 15 each are the cover glass in the foregoing embodiments, the film 12 and the film 14 each are the film in the embodiments of the present invention. As shown in FIG. 1, the film 12 is disposed on a lower surface of the cover glass 11, and the film 14 is disposed on an upper surface of the cover glass 15. Optionally, the film 14 may be not disposed on the upper surface of the cover glass 15. It should be noted that the middle frame main housing 13 is only schematically marked, and the middle frame main housing 13 may be specifically a display panel, a mainboard, a battery, a processor, and the like of a terminal device.

The film in the embodiments of the present invention may be specifically classified into two types: a striped texture film and a corrugated texture film. For a specific structure, refer to detailed explanations and descriptions in the following embodiments.

Figure 2A:
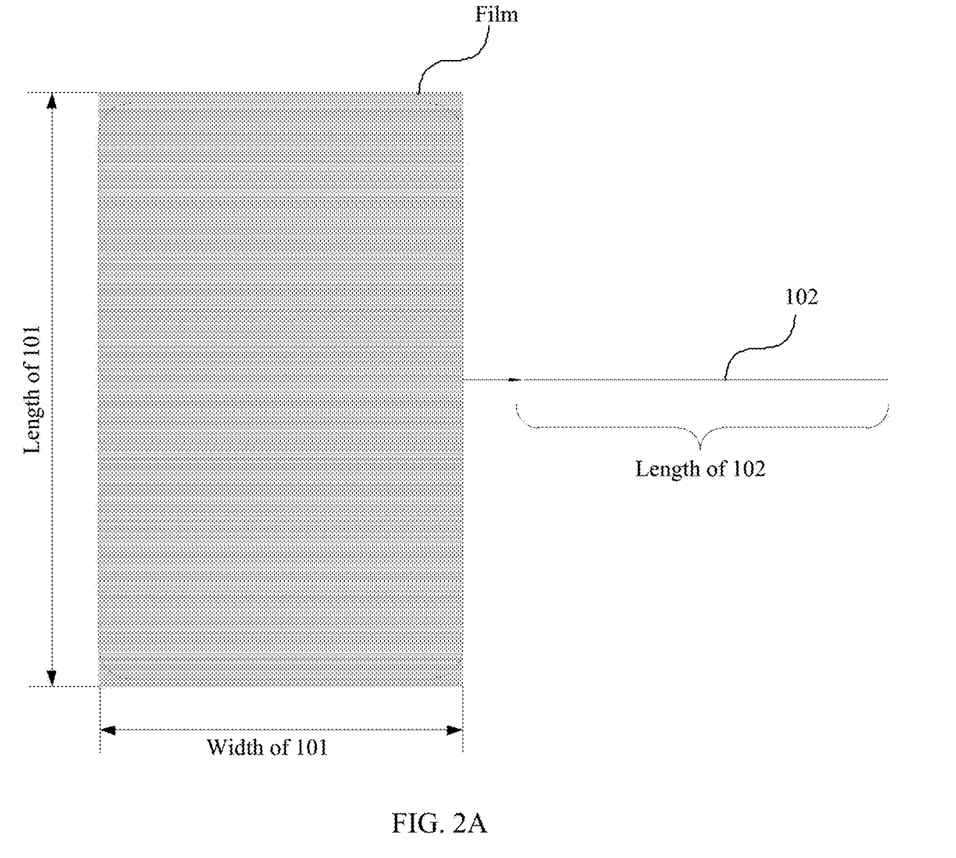
FIG. 2A is a main view of a cross-striped texture film according to the present invention.
Figure 2B:
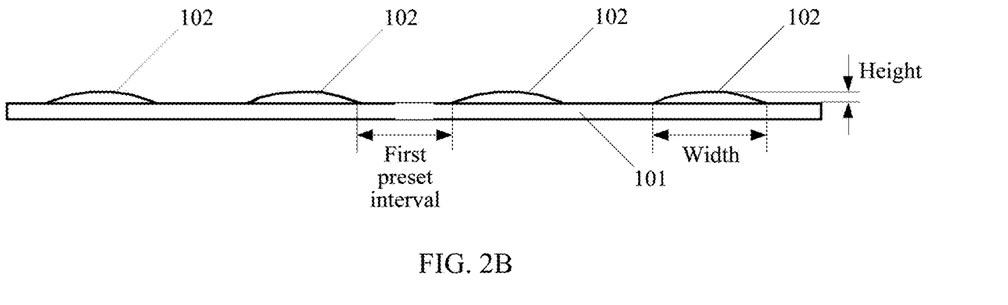
FIG. 2B is a partial left view of the cross-striped texture film according to the present invention.

FIG. 2A is a main view of a cross-striped texture film according to the present invention, and FIG. 2B is a partial left view of the cross-striped texture film according to the present invention. As shown in FIG. 2A and FIG. 2B, the cross-striped texture film in an embodiment may include: a film body 101 and a plurality of rectilinear protrusions 102. The plurality of rectilinear protrusions 102 are distributed in sequence on a surface of the film body 101, and neighboring rectilinear protrusions 102 are parallel to each other. According to the film shown in FIG. 2A, the plurality of rectilinear protrusions 102 are densely distributed on the film body 101. For clear illustration, one rectilinear protrusion on the film body 101, that is, 102 shown in FIG. 2A, is schematically shown. Further, a shape of each rectilinear protrusion 102 may be learned with reference to FIG. 2B, and may be specifically an arc-shaped. Certainly, each rectilinear protrusion 102 may be of another shape. For details, refer to explanations and descriptions in the following embodiments.

The plurality of rectilinear protrusions 102 may be distributed in sequence on the surface of the film body 101 along a length direction of the film body 101, or may be distributed in sequence on the surface of the film body 101 along a width direction of the film body 101. In a preferable disposition manner, the plurality of rectilinear protrusions 102 are distributed in sequence on the surface of the film body 101 along the length direction of the film body 101, so that the film reflects a cross-striped texture.

Specifically, a value range of a height of the rectilinear protrusion is 2 microns to 30 microns. The value range of the height of each rectilinear protrusion 102 shown in FIG. 2B may be specifically 2 microns to 30 microns, and a value of the rectilinear protrusion 102 may be any value between 2 microns to 30 microns. Preferably, values of the height of the rectilinear protrusions 102 may be the same. A value range of a width of the rectilinear protrusion is 20 microns to 200 microns. The value range of the width of each rectilinear protrusion 102 shown in FIG. 2B may be specifically 20 microns to 200 microns, and the value of the width of the rectilinear protrusion 102 may be any value between 20 microns to 200 microns. Preferably, values of the width of the rectilinear protrusions 102 may be the same. A length of the rectilinear protrusion is the same as a width of the film body. As shown in FIG. 2A, the length of the rectilinear protrusion 102 may be the same as the width of the film body 101.

The width of the film body 101 is a width of the film, and a length of the film body is a length of the film.

Neighboring distributed protrusions in the plurality of rectilinear protrusions are spaced at a first preset distance, and a value range of the first preset distance may be 0 microns to 300 microns. That is, there may be no interval between the neighboring distributed rectilinear protrusions, or the neighboring distributed rectilinear protrusions may be spaced at a particular distance. Specifically, the neighboring distributed rectilinear protrusions may be flexibly disposed as required.

Figure 3A:
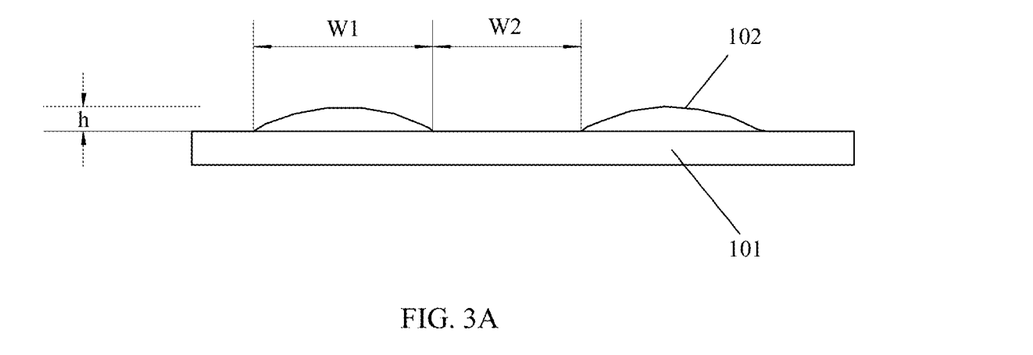
FIG. 3A is a cross-sectional view of Embodiment 1 of a cross-striped texture film along a length direction of a film body.
Figure 3B:
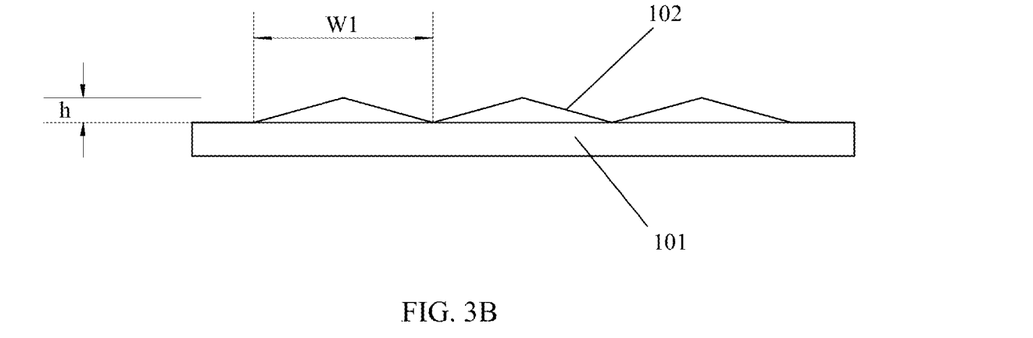
FIG. 3B is a cross-sectional view of Embodiment 2 of a cross-striped texture film along a length direction of a film body.
Figure 3C:
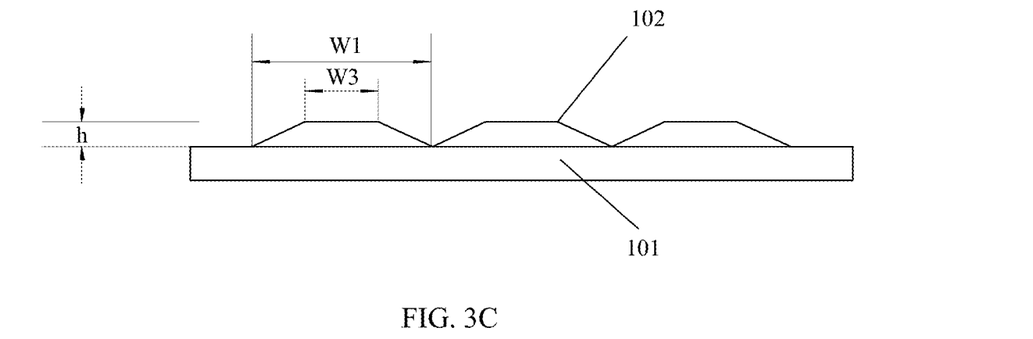
FIG. 3C is a cross-sectional view of Embodiment 3 of a cross-striped texture film along a length direction of a film body.

When the plurality of rectilinear protrusions 102 are distributed in sequence on the surface of the film body 101 along the length direction of the film body 101, cross-sections of the rectilinear protrusion 102 along the length direction of the film body 101 may have various implementations. Several implementable manners below are described as an example in this embodiment, and the length direction of the film body is specifically shown in FIG. 2A. FIG. 3A is a cross-sectional view of Embodiment 1 of the cross-striped texture film along the length direction of the film body. FIG. 3B is a cross-sectional view of Embodiment 2 of the cross-striped texture film along the length direction of the film body. FIG. 3C is a cross-sectional view of Embodiment 3 of the cross-striped texture film along the length direction of the film body. In the foregoing schematic views, only one or two rectilinear protrusions is/are schematically explained for description, and all rectilinear protrusions on the cross-striped film may be disposed on the film body in a same manner. As shown in FIG. 3A, a cross-section of the rectilinear protrusion along the length direction of the film body is arc-shaped, and a film on which the rectilinear protrusion has an arc-shaped cross-section is used. Preferably, a value range of a first preset interval between neighboring rectilinear protrusions may be set to 0 microns to 300 microns, that is, W2∈[0,300] The height of the rectilinear protrusion is h∈[2,30], and the width of the rectilinear protrusion is W1∈[20,200], both measured in micron. As shown in FIG. 3B, a cross-section of the rectilinear protrusion along the length direction of the film body is triangular, and a film on which the rectilinear protrusion has a triangular cross-section is used. Preferably, a value of the first preset interval between neighboring rectilinear protrusions may be set to 0, that is, there is no interval between neighboring rectilinear protrusions. Value ranges of a height h of the rectilinear protrusion and a width W1 of the rectilinear protrusion may be the same as those in FIG. 3A. As shown in FIG. 3C, a cross-section of the rectilinear protrusion along the length direction of the film body is trapezoidal, and a film on which the rectilinear protrusion has a trapezoidal cross-section is used. Preferably, a value of the first preset interval between neighboring rectilinear protrusions may be set to 0, that is, there is no interval between neighboring rectilinear protrusions. A value range of a top side of the trapezoidal cross-section is greater than 0 microns and less than a length of a bottom side of the trapezoidal cross-section. Specifically, value ranges of the width of the rectilinear protrusion (that is, the length of the bottom side of the trapezoidal cross-section) W1 and the height h of the rectilinear protrusion may be the same as those in FIG. 3A, and specifically, a length of the top side of the trapezoidal cross-section may be W3∈(0,300).

The plurality of rectilinear protrusions 102 are distributed on the surface of the film body, so that the film reflects a cross-striped texture. When the cross-striped texture film in this embodiment is disposed on a rear surface of a cover glass, a vacuum plating process may be used, and the cross-striped texture film can effectively weaken a phenomenon of excessive glossiness caused by the vacuum plating process, so that color of the cover glass adhered to the cross-striped texture film is finer, and product quality can be effectively improved.

In this embodiment, the plurality of rectilinear protrusions are disposed on the surface of the film body of the film, the neighboring rectilinear protrusions are parallel to each other, so that the film reflects a striped texture. When the film in this embodiment is adhered to the rear surface of the cover glass, intrinsic reflectivity and a refractive index of the cover glass can be effectively changed, the cover glass can generate an extremely rich and fine dazzling effect, and a sense of layering and transparency of the cover glass are enhanced, thereby effectively improving a display effect of a product.

It should be noted that the film in this embodiment of the present invention includes a film body and a striped protrusion, and the film body and the striped protrusion may be integrally molded.

Figure 4A:
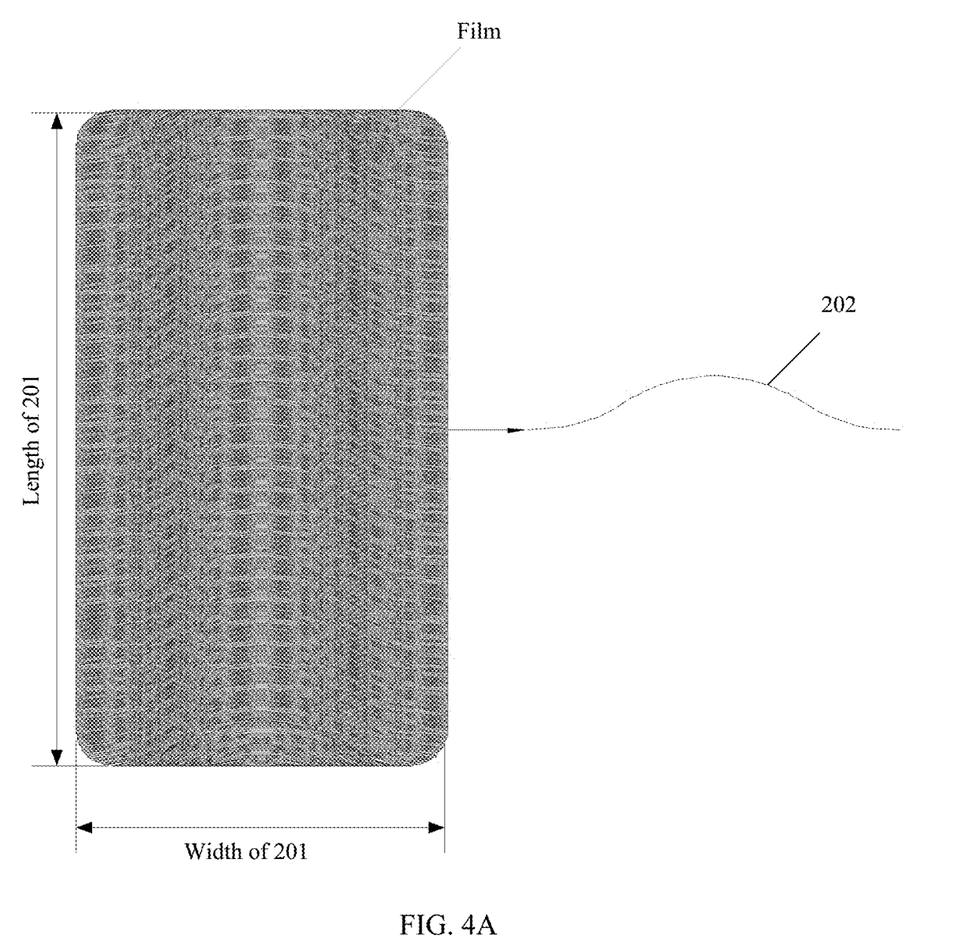
FIG. 4A is a main view of a corrugated texture film according to the present invention.
Figure 4B:
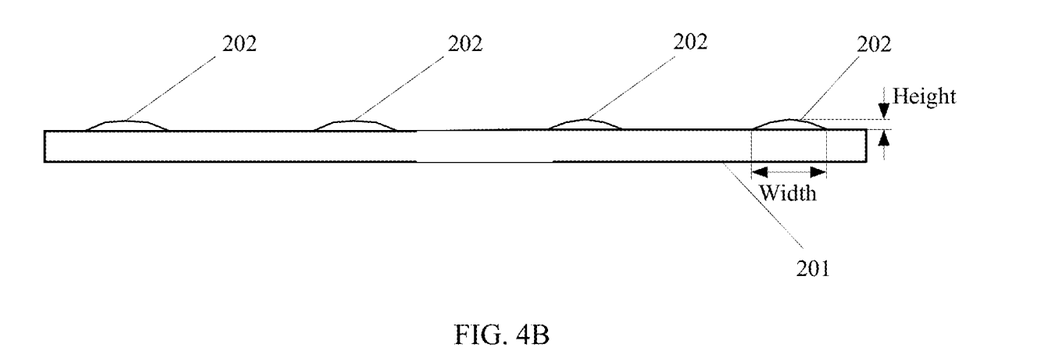
FIG. 4B is a partial left view of a corrugated texture film according to the present invention.

FIG. 4A is a main view of a corrugated texture film according to the present invention, and FIG. 4B is a partial left view of the corrugated texture film according to the present invention. As shown in FIG. 4A and FIG. 4B, the corrugated texture film in an embodiment may include: a film body 201 and a plurality of corrugated protrusions 202. The plurality of corrugated protrusions 202 are distributed in sequence on a surface of the film body 201, and neighboring corrugated protrusions are parallel to each other. In an implementable manner, the plurality of corrugated protrusions 202 may be specifically distributed in sequence on the surface of the film body 201 along a length direction of the film body 201 (that is, as shown in FIG. 4A). In another implementable manner, the plurality of corrugated protrusions 202 may be specifically distributed in sequence on the surface of the film body along a width direction of the film body 201 (not shown). As shown in FIG. 4A, the plurality of corrugated protrusions 202 are densely distributed on the film body 101, presenting a texture shape. For clear illustration, one corrugated protrusion on the film body 201, that is, 202 shown in FIG. 4A, is schematically shown. Further, it may be learned with reference to FIG. 4B that each corrugated protrusion is arc-shaped in a left view direction.

Specifically, a value range of a height of the corrugated protrusion 202 may be 2 microns to 20 microns, and a value range of a width of the corrugated protrusion 202 may be 20 microns to 200 microns. A length of the corrugated protrusion 202 along the width direction of the film body 201 is the same as a width of the film body. Neighboring distributed corrugated protrusions in the plurality of corrugated protrusions are spaced at a second preset distance, and a value range of the second preset distance may be 20 microns to 250 microns.

Figure 5:
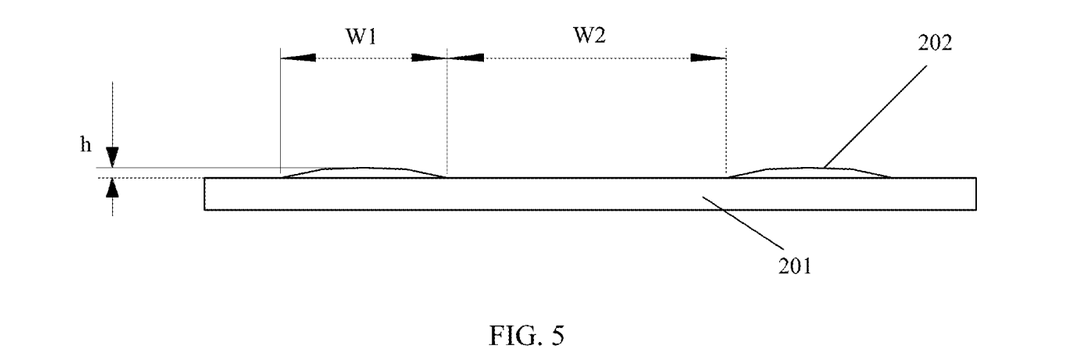
FIG. 5 is a cross-sectional view of a corrugated texture film along a length direction of a film body.

When the plurality of corrugated protrusions 202 are distributed in sequence on the surface of the film body 201 along the length direction of the film body 201, cross-sections of the rectilinear protrusion 202 along the length direction of the film body 201 may have various implementable manners. In a preferable manner, FIG. 5 is a cross-sectional view of the corrugated texture film along the length direction of the film body. Only two corrugated protrusions 202 are schematically described herein, and other corrugated protrusions 202 may be disposed in a same manner. As shown in FIG. 5, a cross-section of the corrugated protrusion 202 along the length direction of the film body 201 is arc-shaped. The height of the corrugated protrusion 202 is $h \in [2,30]$, the width of the corrugated protrusion 202 is $W1 \in [20,200]$, and the second preset interval between two corrugated protrusions 202 is $W2 \in [20,250]$, all measured in micron. Certainly, it may be understood that a cross-section of the corrugated protrusion 202 along the length direction of the film body 201 may alternatively be of another shape.

In this embodiment, the plurality of corrugated protrusions are disposed on the surface of the film body of the film, the neighboring corrugated protrusions are parallel to each other, so that the film reflects a corrugated texture. When the film in this embodiment is adhered to the rear surface of a glass panel, intrinsic reflectivity and a refractive index of the cover glass can be effectively changed, the cover glass can generate an extremely rich and fine dazzling effect, and a sense of layering and transparency of the cover glass are enhanced, thereby effectively improving a display effect of a product.

It should be noted that the film in this embodiment of the present invention includes a film body and a corrugated protrusion. The film body and the corrugated protrusion may be integrally molded, and a material of the protrusion may be the same as or may be different from a material of the film body.

It should be noted that production costs of adhering the film in the foregoing embodiments of the present invention to the rear surface of the cover glass are far less than production costs of cover glasses processed by using a glass direct molding (Glass Direct Molding, GDM for short) process.

Figure 6:
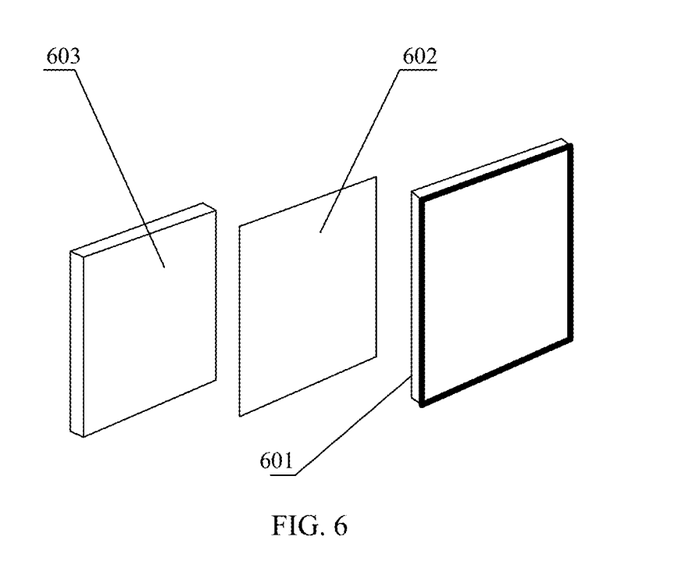
FIG. 6 is a simplified schematic exploded view of Embodiment 1 of a display according to the present invention.

FIG. 6 is a simplified schematic exploded view of Embodiment 1 of the display according to the present invention. As shown in FIG. 6, the display in this embodiment may include: a cover glass 601, a film 602, and a display panel 603. The film 602 may use a structure in any embodiment of FIG. 2A to FIG. 3C, and details are not described herein again. Their implementation principles and technical effects are similar, and details are not described herein again. Certainly, the display may further include other components, and the components are not described herein one by one.

Figure 7:
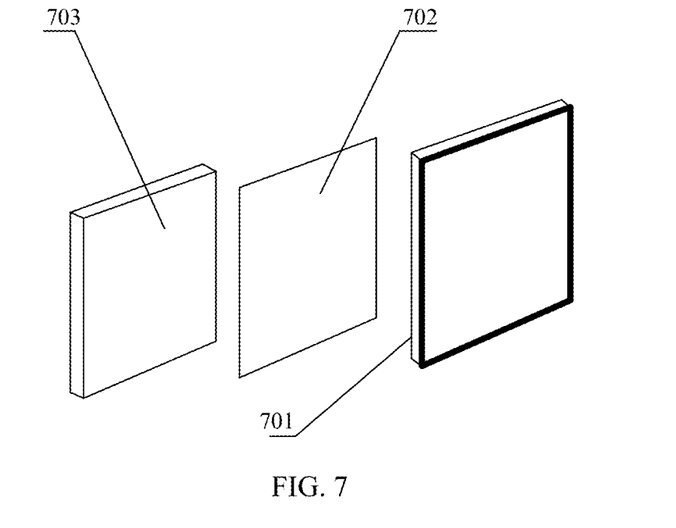
FIG. 7 is a simplified schematic exploded view of Embodiment 2 of a display according to the present invention.

FIG. 7 is a simplified schematic exploded view of Embodiment 2 of the display according to the present invention. As shown in FIG. 7, the display in this embodiment may include: a cover glass 701, a film 702, and a display panel 703. The film 702 may use a structure in any embodiment of FIG. 4A to FIG. 5, and details are not described herein again. Their implementation principles and technical effects are similar, and details are not described herein again. Certainly, the display may further include other components, and the components are not described herein one by one.

In the several embodiments provided in the present invention, it should be understood that the disclosed apparatus and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may be not physically separate, and parts displayed as units may or may be not physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not further described herein.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A film applied to a display, comprising:
a film body; and
a plurality of corrugated protrusions distributed in sequence on a surface of the film body, neighboring corrugated protrusions being parallel to each other; wherein:
the plurality of corrugated protrusions are distributed in sequence on the surface of the film body along a length direction of the film body;

a width of each of the corrugated protrusions extends along the length direction of the film body, and a length of each of the corrugated protrusions extending along a width direction of the film body is the same as a width of the film body; and a height profile of each of the corrugated protrusions progressing from one end of the width of the film body to the other end of the width of the film body corresponds to a bell-shaped curve, seen in cross-section along the length of each of the corrugated protrusions.

2. The film of claim 1, wherein a value range of a height of each corrugated protrusion comprises 2 microns to 20 microns.

3. The film of claim 1, wherein a value range of a width of each corrugated protrusion comprises 20 microns to 200 microns.

4. The film of claim 1, wherein neighboring distributed corrugated protrusions in the corrugated protrusions are spaced apart from each other by a preset distance, and a value range of the preset distance comprising 20 microns to 250 microns.

5. The film of claim 1, wherein a cross-section of each corrugated protrusion along the length direction of the film body is arc-shaped.

6. A display, comprising:
a cover glass; and
a film adhered to the cover glass and comprising:
a film body; and
a plurality of corrugated protrusions distributed in sequence on a surface of the film body, neighboring corrugated protrusions being in parallel to each other; wherein:
the plurality of corrugated protrusions are distributed in sequence on the surface of the film body along a length direction of the filth body;
a width of each of the corrugated protrusions extends along the length direction of the film body, and a length of each of the corrugated protrusions extending along a width direction of the film body is the same as a width of the film body; and
a height profile of each of the corrugated protrusions progressing from one end of the width of the film body to the other end of the width of the filth body corresponds to a bell-shaped curve, seen in cross-section along the length of each of the corrugated protrusions.

7. A terminal, comprising a display, and the display comprising:
a cover glass; and
a film adhered to the cover glass and comprising:
a film body; and
a plurality of corrugated protrusions distributed in sequence on a surface of the film body, neighboring corrugated protrusions being in parallel to each other; wherein:
the plurality of corrugated protrusions are distributed in sequence on the surface of the film body along a length direction of the film body;
a width of each of the corrugated protrusions extends along the length direction of the film body, and a length of each of the corrugated protrusions extending along a width direction of the film body is the same as a width of the film body; and
a height profile of each of the corrugated protrusions progressing from one end of the width of the film body to the other end of the width of the film body corresponds to a bell-shaped curve, seen in cross-section along the length of each of the corrugated protrusions.

8. The display of claim 6, wherein a value range of a height of each of the corrugated protrusions is 2 microns to 20 microns.

9. The display of claim 6, wherein a value range of a width of each of the corrugated protrusions is 20 microns to 200 microns.

10. The display of claim 6, wherein neighboring distributed corrugated protrusions in the corrugated protrusions are spaced apart from each other by a preset distance, and a value range of the preset distance is 20 microns to 250 microns.

11. The display of claim 6, wherein a cross-section of each of the corrugated protrusions along the length direction of the film body is arc-shaped.

* * * * *

UNITED STATES PATENT AND TRADEMARK OFFICE
CERTIFICATE OF CORRECTION

PATENT NO. : 10,823,896 B2  
APPLICATION NO. : 16/073170  
DATED : November 3, 2020  
INVENTOR(S) : Meng Li et al.

Page 1 of 1

It is certified that error appears in the above-identified patent and that said Letters Patent is hereby corrected as shown below:

Column 8, Line 63, reads:  
"film body 101, presenting a texture shape...."  
Should read:  
"film body 201, presenting a texture shape...."

Column 11, Line 35, reads:  
"length direction of the filth body;"  
Should read:  
"length direction of the film body;"

Column 12, Line 1, reads:  
"body to the other end of the width of the filth body"  
Should read:  
"body to the other end of the width of the film body"

Signed and Sealed this  
Fifth Day of January, 2021

Andrei Iancu  
*Director of the United States Patent and Trademark Office*